United States Patent
Ogino et al.

(10) Patent No.: US 6,699,169 B2
(45) Date of Patent: Mar. 2, 2004

(54) CENTRIFUGAL EXTRACTOR WITH NEUTRON ABSORPTION BODY

(75) Inventors: Hideki Ogino, Naka-gun (JP); Tadahiro Washiya, Naka-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 29 days.

(21) Appl. No.: 10/356,584

(22) Filed: Feb. 3, 2003

(65) Prior Publication Data

US 2004/0023779 A1 Feb. 5, 2004

(30) Foreign Application Priority Data

Aug. 2, 2002 (JP) .......................... 2002-225769

(51) Int. Cl.[7] .............................. B04B 5/06; B04B 15/00
(52) U.S. Cl. .............................. 494/22; 494/63; 494/65; 494/67; 494/79; 494/83
(58) Field of Search ...................................... 494/74, 79

(56) References Cited

U.S. PATENT DOCUMENTS

| | | | | |
|---|---|---|---|---|
| 2,474,006 A | * | 6/1949 | Maycock | |
| 2,474,007 A | * | 6/1949 | Maycock | |
| 2,819,014 A | * | 1/1958 | Zabriskie, Jr. | |
| 3,332,614 A | * | 7/1967 | Webster et al. | |
| 3,674,196 A | * | 7/1972 | Gutter | |
| 4,786,480 A | * | 11/1988 | Martin | |
| 4,824,430 A | * | 4/1989 | Kashihara et al. | |
| 4,857,040 A | * | 8/1989 | Kashihara et al. | |
| 4,925,441 A | * | 5/1990 | Jubin | |
| 4,959,158 A | * | 9/1990 | Meikrantz | |
| 5,024,647 A | * | 6/1991 | Jubin et al. | |
| 5,254,075 A | | 10/1993 | Nemoto et al. | |
| 5,254,076 A | * | 10/1993 | Chow et al. | |
| 5,267,936 A | * | 12/1993 | Miachon | |
| 5,571,070 A | * | 11/1996 | Meikrantz et al. | |
| 5,591,340 A | * | 1/1997 | Meikrantz et al. | |
| 6,102,843 A | * | 8/2000 | Kelley et al. | .................. 494/79 |
| 6,203,483 B1 | * | 3/2001 | Birdwell et al. | |
| 6,238,329 B1 | * | 5/2001 | Rogers | |
| 6,379,293 B1 | * | 4/2002 | Kim et al. | |
| 6,440,054 B1 | * | 8/2002 | Galik | |

FOREIGN PATENT DOCUMENTS

EP 343802 * 11/1989

* cited by examiner

Primary Examiner—Charles E. Cooley
(74) Attorney, Agent, or Firm—Wenderoth, Lind & Ponack L..L.P.

(57) ABSTRACT

A centrifugal extractor has a rotor supported rotatably in a housing 10, and an aqueous phase liquid and an organic phase liquid are supplied to the outer circumference of the rotor and mixed between the housing and the rotor. A mixed phrase liquid is sucked into the rotor and is separated into two phases in a centrifugal force field generated in the inside of the rotor, and the separated aqueous phase liquid and organic phase liquid are discharged to an aqueous phase collector 50 and an organic phase collector 44, respectively. A cavity portion is provided in the center of the rotor, and a neutron absorption body 60 is disposed in the cavity portion. Preferably, the rotor has a lower rotating and supporting mechanism (such as a sliding bearing 66), and a neutron absorption material is sealed into the lower rotating and supporting mechanism. By such a centrifugal extractor, criticality safety and durability can be enhanced, even when the extractor is designed to be larger-size and larger-capacity.

8 Claims, 5 Drawing Sheets

CENTRIFUGAL EXTRACTOR WITH NEUTRON ABSORPTION BODY

BACKGROUND OF THE INVENTION

The present intention relates to a centrifugal extractor in which a cavity for housing a neutron absorption body is provided in the center of a rotor. The centrifugal extractor is used, for example, in reprocessing spent nuclear fuel, to extract and separate U (uranium) and Pu (plutonium).

There is a Purex process which is one of the reprocessing processes for spent nuclear fuel produced from nuclear facilities. This process comprises, as is well-known dissolving the spent nuclear fuel into nitric acid, and separating and recovering U and Pu dissolved in the acid aqueous solution of nitric acid by a solvent extraction operation.

There are some kinds of apparatuses for carrying out the solvent extraction operation, one of which is a centrifugal extractor for carrying out separation of two phases (an aqueous phase and an organic phase) by centrifugal force. The centrifugal extractor is designed so that a rotor is rotatably supported such that the rotor is suspended in a housing, an aqueous phase and an organic phase are supplied to the outer circumference of the rotor and mixed between the housing and the rotor, the mixed phase is sucked into the rotor and separated into two phases in a centrifugal force field generated in the rotor, and the separated phases are discharged to corresponding collectors, respectively (See, for example, U.S. Pat. No. 5,254,075.)

Such a centrifugal extractor as described above has advantages in that processing speed is high, the start-up of the apparatus is quick, the operating efficiency is enhanced and equipment can be simplified, the apparatus can be designed to be smaller, and solvent degradation by radiation can be reduced, as compared with other extractors (for example, such as a mixer-settler extraction apparatus, a pulse column extraction apparatus, etc.). Therefore, the centrifugal extractor is considered to be advantageous for reprocessing a spent nuclear fuel of high burnup and high Pu enrichment produced from a fast breeder reactor, and research and development thereof have progressed.

Considering the shift from the stage of research and development to the stage of practical plant employment, it is necessary to make a centrifugal extractor larger in size and larger in capacity in order to improve the processing ability. However, when an attempt is made to design a large-sized centrifugal extractor using the above-described prior art design technique, criticality control is hard to carry out merely by geometric control, and some countermeasures are necessary in terms of criticality safety. Therefore, it is considered that for example, criticality control is carried out by concentration control or the like, but a process thereof requires complicated and trouble some operation control and poses many problems in terms of safety.

Further, when the centrifugal extractor is made larger in size, the weight and outside diameter of the rotor also increase, and the burden of a supporting means in the upper portion of the rotor becomes great, thus posing a problem that durability of a driving means lowers.

SUMMARY OF THE INVENTION

An object of the present invention is therefore to provide a centrifugal extractor in which for larger sizes and larger capacities, enhancement of criticality safety can be achieved.

A further object of the present invention is to provide a centrifugal extractor in which for larger sizes and larger capacities, enhancement of durability can also be achieved.

According to the present invention, there is provided a centrifugal extractor comprising a housing having a bearing disposed thereon, a rotary shaft supported by the bearing and extending downward into the housing, and a rotor rotatably supported in the housing such that the rotor is suspended by the rotary shaft. The rotor is spaced from an inner wall of the housing to form a gap therebetween, and an aqueous phase and an organic phase are supplied to the gap and mixed in the gap. A mixed phase is sucked into the rotor and separated into two phases in a centrifugal force field generated in the rotor, and the separated phases are discharged to corresponding collectors, respectively. A cavity portion is provided in the center of the rotor, and a neutron absorption body is disposed in the cavity portion.

In this case, it is preferable to employ a construction in which the neutron absorption body comprises a cylindrical body standing upright from the bottom of the housing toward the cavity portion in the center of the rotor, and a neutron absorption material sealed into the cylindrical body.

It is also possible to employ a construction in which the neutron absorption body comprises a cylindrical body suspended down from the rotary shaft towards the cavity portion in the center of the rotor, and a neutron absorption material sealed into the cylindrical body.

According to the present invention, there is also provided a centrifugal extractor comprising: a housing having a bearing disposed thereon, a rotary shaft supported by the bearing and extending downward into the housing, and a rotor rotatably supported in the housing such that the rotor is suspended by the rotary shaft. The rotor is spaced from an inner wall of the housing to form a gap therebetween, and an aqueous phase and an organic phase are supplied to the gap and mixed in the gap. A mixed phase is sucked into the rotor and separated into two phases in a centrifugal force field generated in the rotor, and the separated phases are discharged to corresponding collectors, respectively. A cavity portion is provided in the center of the rotor, a cylindrical body stands upright form the bottom of the housing towards the cavity portion, a lower supporting and rotating mechanism of the rotary shaft is disposed at the upper end of the cylindrical body, and a neutron absorption material is sealed into the cylindrical body.

BRIEF DESCRIPTION OF THE DRAWINGS

FIG. 1 is an explanatory view of a centrifugal extractor having a cavity portion the center thereof, in which

FIG. 2 is an explanatory view showing an embodiment of a centrifugal extractor according to the present invention, in which

FIG. 3 is an explanatory view showing a further embodiment of a centrifugal extractor according to the present invention, in which

FIG. 4 is an explanatory view showing another embodiment of a centrifugal extractor according to the present invention, in which

FIG. 5 is an explanatory view showing still another embodiment of a centrifugal extractor according to the present invention, in which

DETAILED DESCRIPTION OF THE INVENTION

Figures 1A, 1B, 1C:
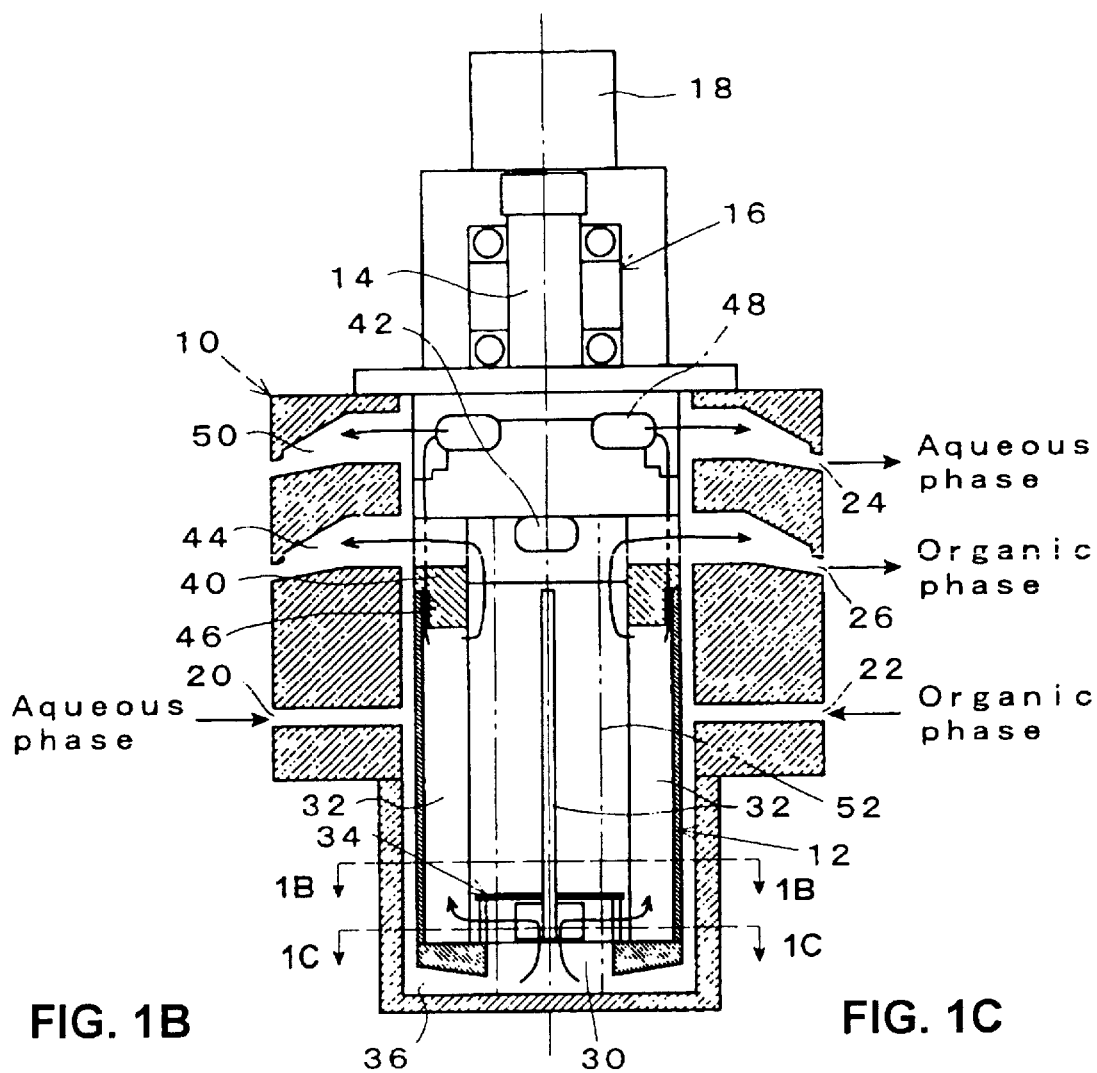
FIG. 1A is a side view.
FIGS. 1B and 1C are cross-sectional plan views.

FIGS. 1A, 1B and 1C are explanatory views of a centrifugal extractor having a cavity portion in the center thereof, and this structure provides a premise of the present invention. A rotor 12 is suspended by a rotary shaft 14 within a housing 10. The rotary shaft 14 is rotatably supported by an upper bearing 16, and the rotor 12 is rotated via the rotary shaft 14 driven by a motor 18 mounted on the uppermost portion. An aqueous phase liquid inlet 20 and an organic phase liquid inlet 22 are formed on the sides of the housing 10, respectively. An aqueous phase discharge flowpassage 24 and an organic phase discharge flowpassage 26 are provided on the sides thereof. The rotor 12 is cylindrical, and a liquid inlet portion 30 having a predetermined dimension is opened at the lower end thereof. As shown in FIGS. 1B and 1C, four flat plate-like vanes 32 are disposed inside the rotor 12 so that they protrude from the inner circumferential wall of the rotor 12 at symmetrical intervals of 90 degrees and extend in an axial direction of the rotor 12. A deflecting member 34 for changing a flow direction of liquid (for preventing liquid from moving upward straightly) is disposed above the liquid inlet portion 30.

An aqueous phase liquid and an organic phase liquid are supplied from the aqueous phase liquid inlet 20 and the organic phase liquid inlet 22, respectively. The two supplied phases of liquid are mixed by rotation of the rotor 12 in a clearance (a mixing portion 36) between the rotor 12 and the housing 10. By this mixing, extraction of a target ion is carried out. The mixed liquid after completion of mixing and extraction enters the rotor 12 through the liquid inlet portion 30 of the rotor. In order to guide the mixed liquid towards the vanes 32 (i.e. for preventing the liquid from moving upward directly), the deflecting member 34 whose upper surface is closed and side is opened is disposed above the liquid inlet portion 30, so that the mixed liquid is supplied from the opened side of the deflecting member 34 into the rotor 12. The mixed liquid entering the rotor 12 is separated into two phases by centrifugal force of the rotor 12.

The liquid in the rotor rises up along the vanes 32, and the organic phase is discharged to an organic phase collector 44 passing through an organic phase weir 40 and an organic phase discharge port 42. On the other hand, the aqueous phase is discharged to an aqueous phase collector 50 passing through an aqueous phase underflow portion 46, an aqueous phase weir, and an aqueous phase discharge port 48. The liquids received in both collectors 50 and 44 flow to the next stage passing through the aqueous phase discharge flowpassage 24 and the organic phase discharge flow passage 26, respectively. Normally, since the centrifugal extractor of this kind has a multistage structure, the aqueous phase discharge flowpassage 24 is connected to the aqueous phase liquid inlet 20 of the next stage, and the organic phase discharge flowpassage 26 is connected to the organic phase liquid inlet 22 of the next stage.

The structure and operation of the centrifugal extractor as described above may basically be similar to that of prior art design technique. In the centrifugal extractor according to the present invention, a large cavity portion 52 is provided in the center of the rotor 12, which is one of the characteristic points in the present invention. This structure makes use of the fact that the mixed liquid sucked into the rotor 12 flows along the inner peripheral portion of the rotor by centrifugal force, and can be realized by enlarging the radius of the liquid inlet portion 30 of the rotor, the radius of the aqueous phase weir, the radius of the organic phase weir 40, and the radius of the aqueous phase underflow portion 46. Along with this, the width (the length in the radius direction of the rotor) of each vane is shortened so that the large cavity portion 52 can be formed in the center of the rotor 12.

Figure 2A:
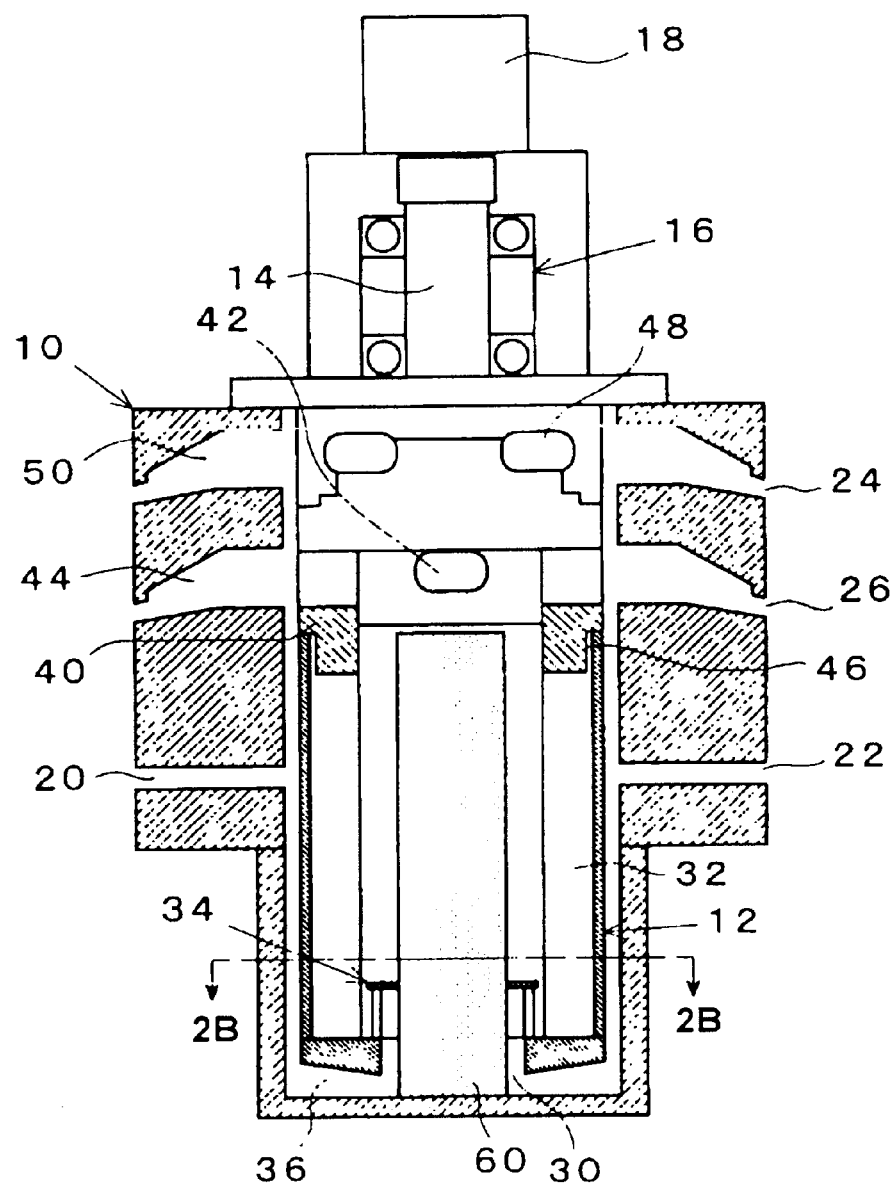
FIG. 2A is a side view and FIG. 2B is a cross-sectional plan view.
Figure 2B:
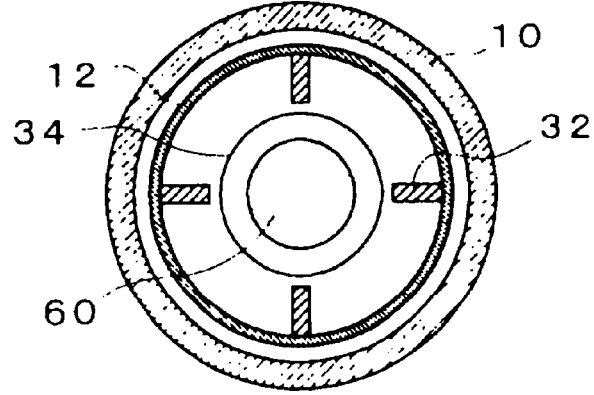

FIGS. 2A and 2B are explanatory views showing an embodiment of a centrifugal extractor according to the present invention. The fundamental structure as a centrifugal extractor is similar to that shown in FIG. 1, and like reference numerals are used to designate the corresponding members for simplifying the explanation. In this embodiment, a neutron absorption body 60 is disposed upright and extending from the bottom of the housing 10 so as to be received in the cavity portion 52 formed inside the rotor (see FIG. 2A). As a neutron absorption material, boron carbide or the like is used. However, since the cavity portion is exposed to a corrosive solution such as nitric acid or a solvent, the neutron absorption body 60 has, for example, a structure in which boron carbide is sealed into a cylindrical body provided with a bottom and a lid and made of stainless steel.

It is necessary to determine the size of the cylindrical body based on the side of the centrifugal extractor to be designed. The design method is described below.

The opening area of the liquid inlet portion is based on conventional rotors. Specifically, in a liquid inlet area enlarged to an extent of 1.7 times of a liquid inlet area computed optimally for a conventional rotor (rotor diameter about 8 cm, capacity about 10 kg/h, and rotor speed 3,500 rpm) for which the design method has been heretofore established, performance was nearly the same as that of the conventional rotor. It has been confirmed that when a liquid inlet area is enlarged to about two times, the performance lowers. Therefore, the liquid inlet area is set to nearly 1.7 times, or an optimal opening area of two times or less is selected, if further enlarged area is required.

The size of the cylindrical body is then determined. If a percentage of occupation of the cylindrical body is nearly 30% or less with respect to the opening area of the liquid inlet portion, the performance remains unchanged as compared with a case in which the cylindrical body is not present. However, it has been confirmed that when the percentage of occupation increases up to an extent of 50%, the performance becomes worse. Therefore, in designing, the percentage of occupation is set to nearly 30%, or the best percentage of occupation of nearly 50% or less is selected, if necessary.

By forming the large cavity portion in the center of the rotor and sealing a neutron absorption material thereinto as described above, geometric control and neutron absorption material control can be carried out simultaneously. Thus, criticality control resulting from a larger type of a centrifugal extractor is facilitated, and safety is also enhanced. Since the neutron absorption body 60 is mounted on the housing 10, an increase in weight of the rotor 12 can be suppressed to a minimum to bring forth an advantage capable of preventing an increase in the burden upon the bearings.

Figure 3A:
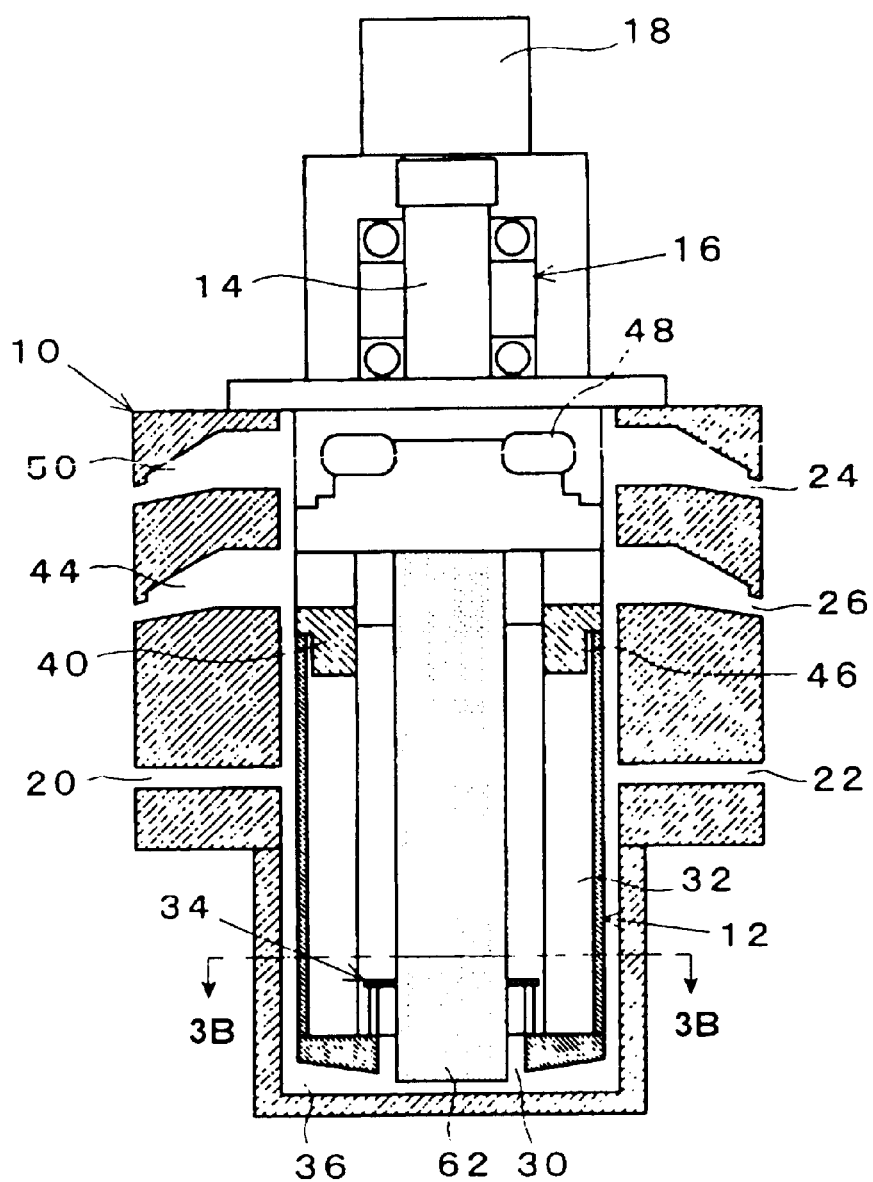
FIG. 3A is a side view and FIG. 3B is a cross-sectional plan view.
Figure 3B:
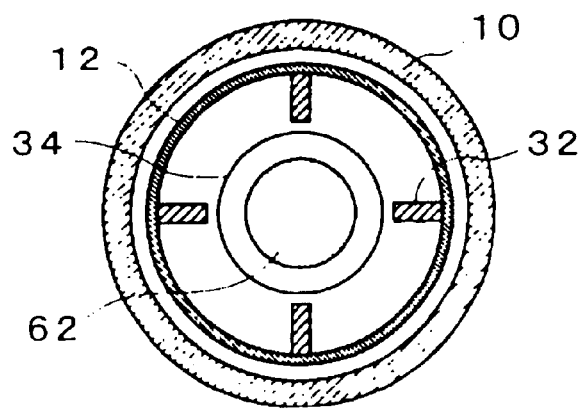

FIGS. 3A and 3B are explanatory views showing a further embodiment of a centrifugal extractor according to the present invention. The fundamental structure as a centrifugal extractor is similar to that shown in FIG. 1, and like reference numerals are used to designate the corresponding members for simplifying the explanation. In this embodiment, a neutron absorption body 62 is disposed inside the rotor 12. The neutron absorption body 62 having a construction in which boron carbide is sealed into a cylindrical body made of stainless steel is suspended down from the rotary shaft 14. Even in this structure, geometric control and neutron absorption material control can be carried out simultaneously.

For simultaneously carrying out the geometric control and neutron absorption material control, a structure may be employed in which the neutron absorption material is disposed around the housing 10. However, for enhancing the neutron absorption effect, it is necessary to shave off waste portions of stainless steel constituting the housing and disposing the neutron absorption material thereon. Therefore, it is likely that the construction will become complicated, a freedom of design of the housing lowers, or miniaturization is disturbed. Because of this, the structure of the present invention in which the neutron absorption material is disposed inside the rotor is better. In a case in which it is necessary to further enhance the neutron absorption effect, it is of course possible to combine the structure of the present invention (in which the neutron absorption material is disposed inside the rotor) and the structure in which the neutron absorption material is disposed around the housing.

FIGS. 4A, 4B, 5A and 5B are explanatory views showing still another embodiment of a centrifugal extractor according to the present invention. Both of these sets of drawings show a construction in which the rotary shaft is supported at both ends thereof, and at the same time, the neutron absorption material is disposed inside the rotor. With such a construction, criticality safety and durability of the rotor can be enhanced.

Figure 4A:
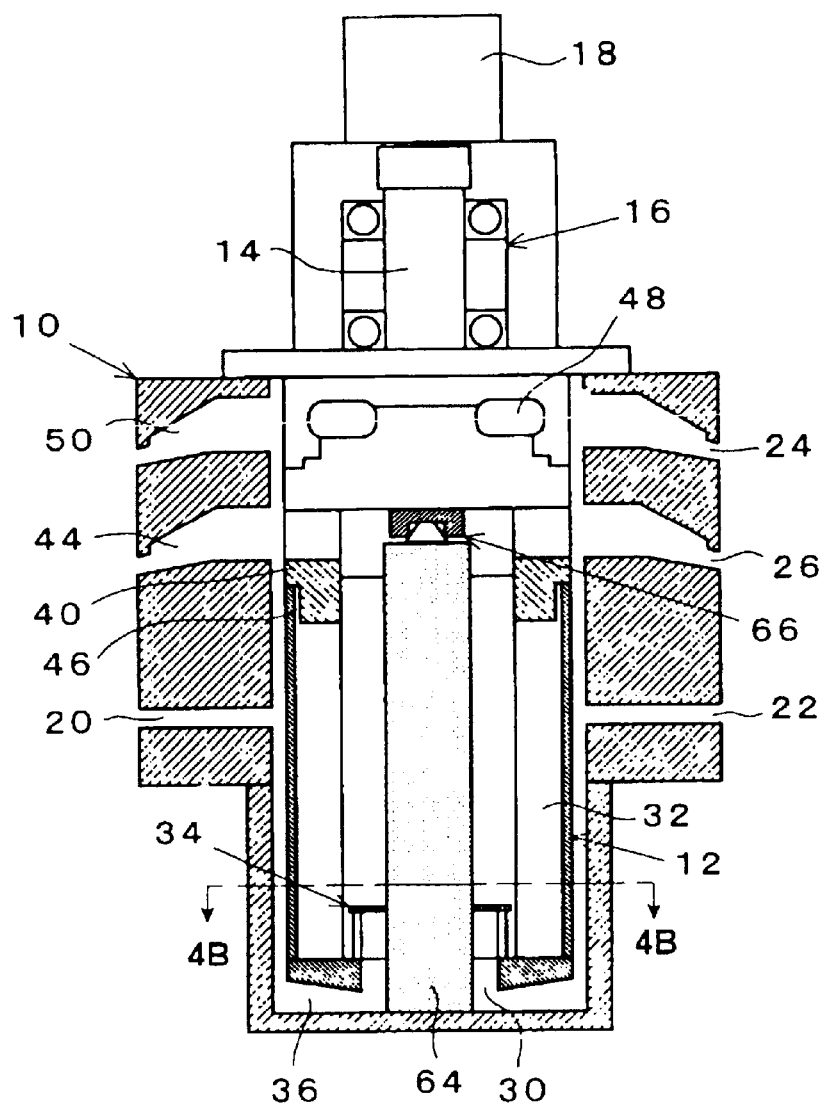
FIG. 4A is a side view and FIG. 4B is a cross-sectional plan view.
Figure 4B:
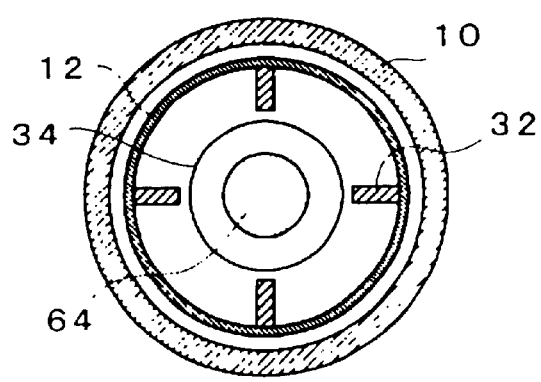

In an example shown in FIGS. 4A and 4B, a cylindrical body (neutron absorption body) 64 is arranged upright in the center at the bottom of the housing 10, and a sliding bearing 66 is mounted on the upper end of the cylindrical body to support the lower end of the rotary shaft 14 of a rotor 12. Namely, the rotary shaft 14 of the rotor 12 is supported by the sliding bearing 66 at its lower end, and by the upper bearing 16 at its upper portion. Thus, even if the rotor is large-sized, the burden applied to the upper bearing 16 is reduced and the rotor can be held stably, and durability of a drive means is enhanced. It is noted that the sliding bearing 66 is positioned at a portion to which liquid does not reach (i.e. an upper portion). Further, the neutron absorption material is sealed into the cylindrical body 64.

Figure 5A:
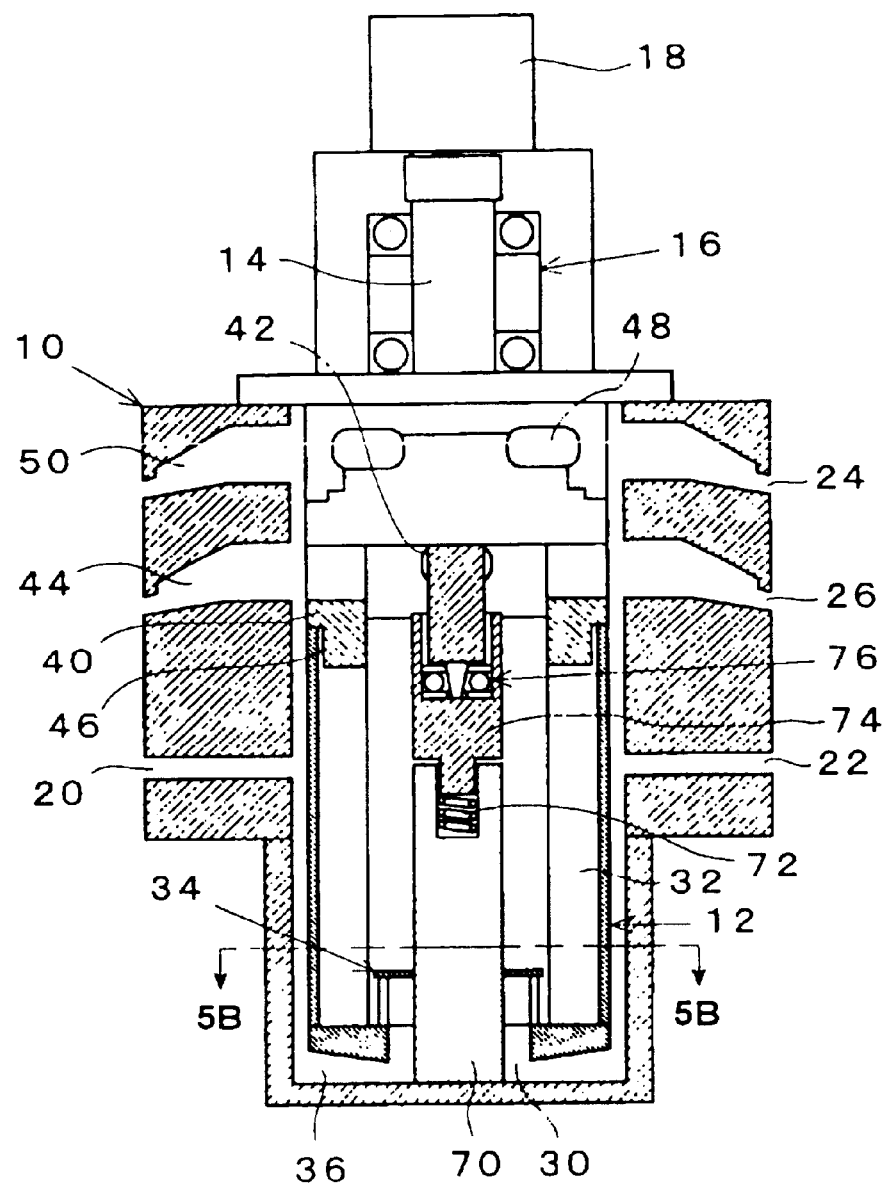
FIG. 5A is a side view and FIG. 5B is a cross-sectional plan view.
Figure 5B:
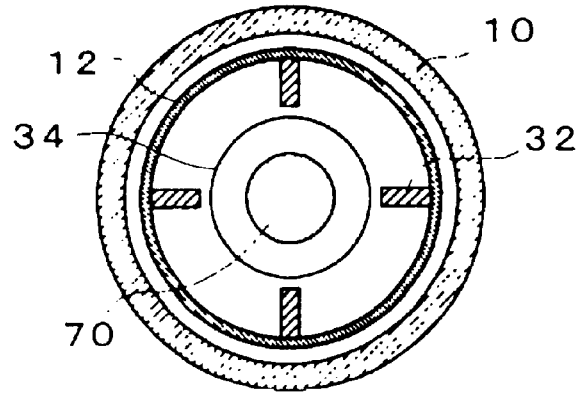

In an example shown in FIGS. 5A and 5B, a cylindrical body (neutron absorption body) 70 having a concave portion at the upper end thereof is arranged upright in the center at the bottom of the housing 10. A bearing support member 74 having a convex portion at the lower end thereof is mounted on the cylindrical body 70 so that the convex portion of the bearing support member 74 is fitted into the concave portion of the cylindrical body 70 via a compression spring 72. A thrust bearing 76 is mounted on the bearing support member 74 to support the lower end of the rotary shaft 14 of the rotor 12. Accordingly, the rotary shaft 14 of the rotor 12 is supported by the thrust bearing 76 at its lower end and the upper bearing 16 at its upper portion. The compression spring 72 always exerts upward force onto the thrust bearing 76 via bearing support member 74. Thus, even if the rotor is large-sized, the burden applied to the upper bearing 16 is reduced and the rotor can be held stably, and durability of a drive means is enhanced. It is noted that a neutron absorption material is sealed into the cylindrical body 70.

As is apparent from the foregoing, since the present invention is a centrifugal extractor in which the neutron absorption material is sealed into the cavity portion formed in the center of the rotor, the effective multiplication factor at the time of criticality evaluation can be lowered. Accordingly, in the case where a large-sized centrifugal extractor is designed, the criticality control can be carried out without depending on a method which requires operation control, such as concentration control, and safety is enhanced.

Further, since the present invention is a centrifugal extractor in which, making use of the cavity portion in the center of the rotor, a lower support means of the rotary shaft is additionally disposed at a portion to which liquid does not reach unnecessary vibrations of the rotor is reduced as compared with the conventional type which has only an upper support means, and durability of the driving means is enhanced, thus providing a longer service life.

What is claimed is:

1. A centrifugal extractor comprising:

a housing having a bearing disposed thereon;

a rotary shaft supported by said bearing and extending downward into said housing; and a rotor rotatably supported in said housing such that said rotor is suspended by said rotary shaft, said rotor being spaced from an inner wall of said housing to form a gap therebetween;

wherein an aqueous phase liquid and an organic phase liquid are supplied to said gap and mixed in said gap, a mixed phase liquid is sucked into said rotor and separated into two liquid phases in a centrifugal force field generated in said rotor, and the separated liquid phases are discharged to corresponding collectors respectively; and wherein a cavity portion is provided in the center of said rotor, and a cylindrical body is arranged so as to stand upright from the bottom of said housing towards said cavity portion, and a lower supporting and rotating mechanism of said rotary shaft is disposed at the upper end of said cylindrical body, and a neutron absorption material is sealed into said cylindrical body.

2. A centrifugal extractor comprising:

a housing having a bearing;

a rotary shaft supported by said bearing and extending downward into said housing;

a rotor rotatably supported in said housing, and being suspended by said rotary shaft so as to form a gap between said rotor and an inner wall of said housing, said housing and said rotor being arranged such that an aqueous phase liquid and an organic phase liquid to be supplied to said gap are mixed in said gap to form a mixed phase liquid, the mixed phase liquid being sucked into said rotor and separated into two separate liquid phases due to a centrifugal force generated in said rotor, and the separate liquid phases are discharged to corresponding collectors, respectively;

a cavity portion formed in the center of said rotor; and a neutron absorption body disposed in said cavity portion, said neutron absorption body including a cylindrical body suspended in a downward direction from said rotary shaft towards said cavity portion in the center of said rotor, and including a neutron absorption material sealed in said cylindrical body.

3. The centrifugal extractor of claim 2, wherein said rotor has a mixed phase liquid inlet at a bottom end thereof, said neutron absorption body being arranged to extend through said mixed phase liquid inlet.

4. The centrifugal extractor of claim 3, wherein said rotor includes a deflecting member at said mixed phase liquid inlet, said deflecting member being shaped and arranged to deflect the mixed phase liquid in an outward direction toward and inner surface of said rotor.

5. The centrifugal extractor of claim 2, wherein said rotor includes a plurality of vanes protruding from an inner surface of said rotor and extending along an axial direction of said rotor, said vanes being equally spaced apart with respect to a circumference of said rotor.

6. A centrifugal extractor comprising:

a housing having a bearing;

a rotary shaft supported by said bearing and extending downward into said housing;

a rotor rotatably supported in said housing and having a top end and a bottom end, said rotor being suspended by said rotary shaft at said top end so as to form a gap between said rotor and an inner wall of said housing, said housing and said rotor being arranged such that an aqueous phase liquid and an organic phase liquid to be supplied to said gap are mixed in said gap to form a mixed phase liquid, said rotor having a mixed phase liquid inlet at said bottom end thereof for allowing the mixed phase liquid to be sucked into said rotor through said mixed phase liquid inlet and separated into two separate liquid phases due to a centrifugal force generated in said rotor, and the separate liquid phases are discharged to corresponding collectors, respectively;

a cavity portion formed in the center of said rotor; and a neutron absorption body disposed in said cavity portion, said neutron absorption body including a cylindrical body standing upright at a bottom of said housing and extending through said mixed phase liquid inlet and towards said cavity portion in the center of said rotor, and including a neutron absorption material sealed in said cylindrical body.

7. The centrifugal extractor of claim 6, wherein said rotor includes a deflecting member at said mixed phase liquid inlet, said deflecting member being shaped and arranged to deflect the mixed phase liquid in an outward direction toward an inner surface of said rotor.

8. The centrifugal extractor of claim 6, wherein said rotor includes a plurality of vanes protruding from an inner surface of said rotor and extending along an axial direction of said rotor, said vanes being equally spaced apart with respect to a circumference of said rotor.

* * * * *